United States Patent Office 3,258,690
Patented June 28, 1966

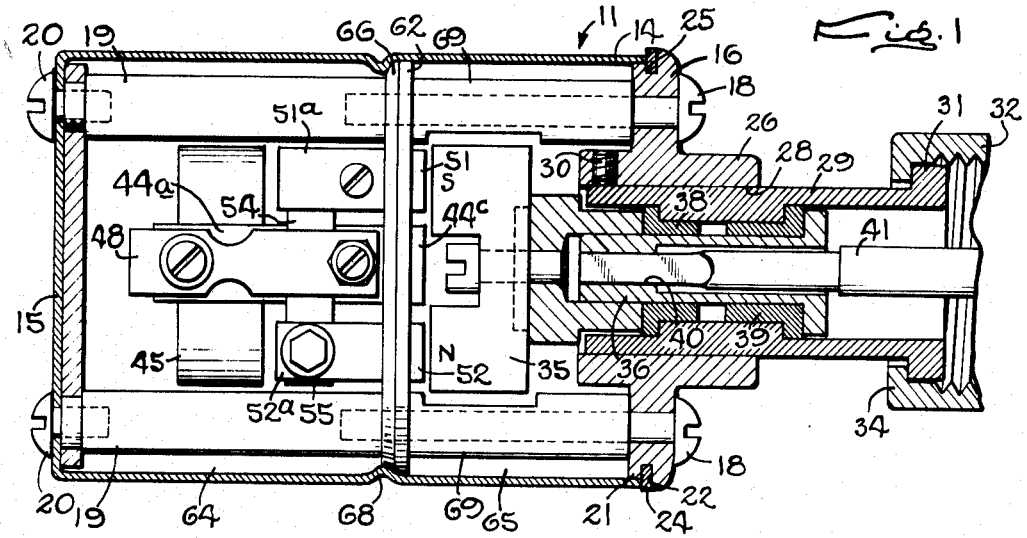
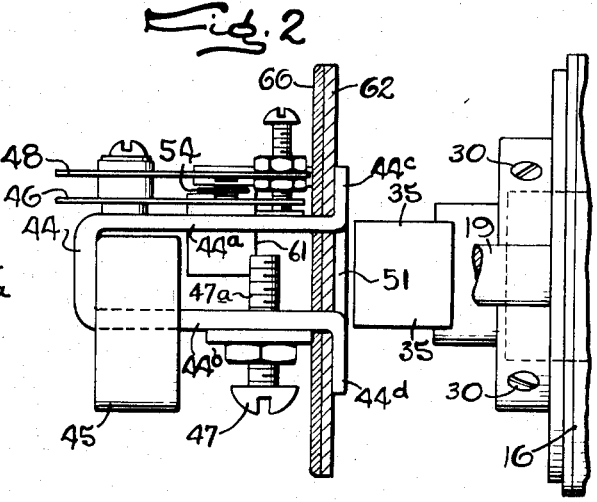
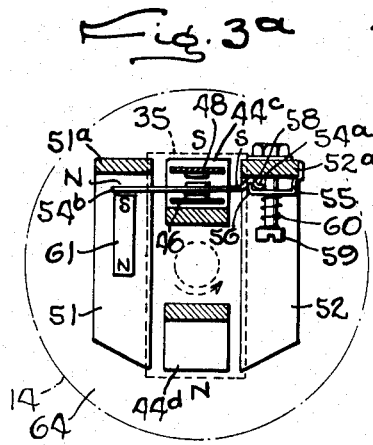
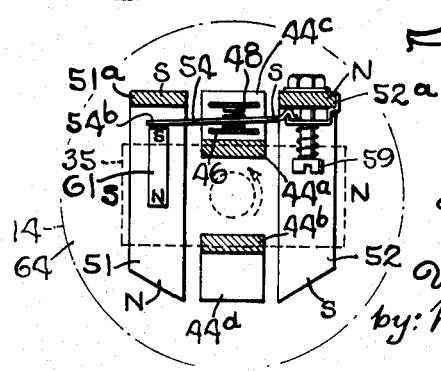

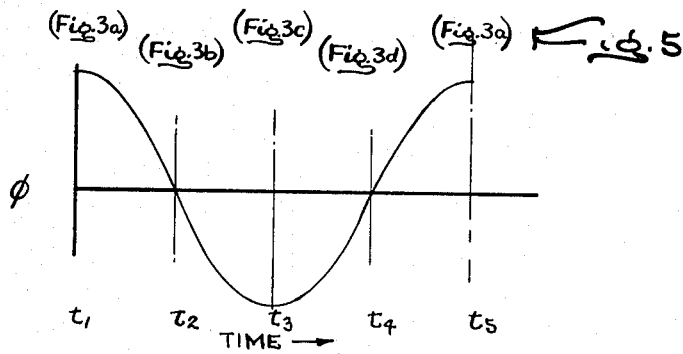
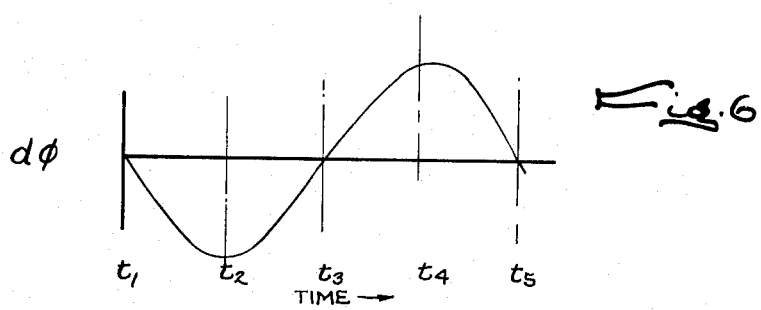
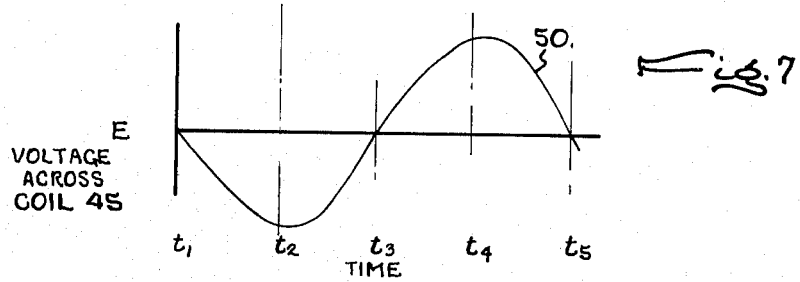
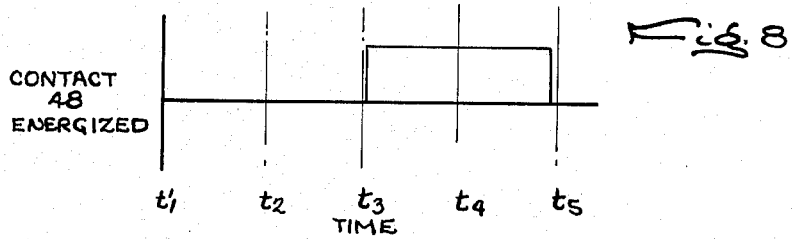
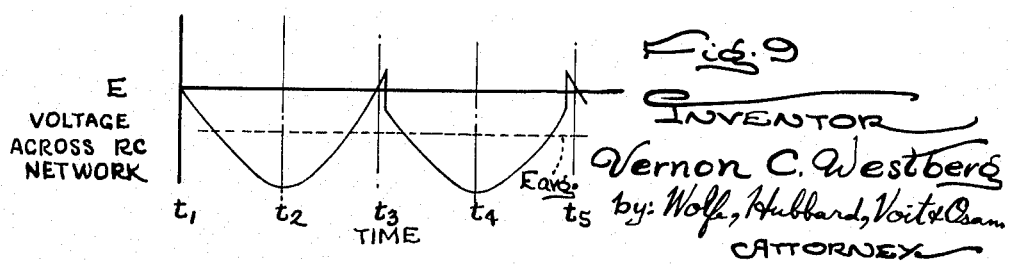

3,258,690
DIRECT CURRENT TACHOMETER GENERATOR UTILIZING MAGNETIC ROTOR CONTROL OF THE RECTIFYING FUNCTION
Vernon C. Westberg, 520 E. Haven St., Arlington Heights, Ill.
Filed July 10, 1962, Ser. No. 208,693
17 Claims. (Cl. 324—70)

The present invention relates in general to a system for measuring the rate of movement of a driving or driven member and, more particularly, to a tachometer of the electromagnetic type particularly suitable for use in measuring the rotational speed of an engine shaft or the like.

It is a general aim of the present invention to provide a rate of movement measuring device characterized by its accuracy and reliability in operation, yet which permits of ease of construction from relatively few inexpensive components.

An important object of the present invention is to provide a self-energized electromagnetic tachometer which is not subject to the deleterious effects of dirt, oil, fumes or the like, and, therefore, requires a minimum of maintenance when in use. While not so limited in its application the invention will find especially advantageous use in measuring the speed in revolutions per minute of rotating components such, for example as drive shafts in gasoline and diesel internal combustion engines of the type employed in trucks, automobiles, aircraft and marine vessels.

Another object of the invention is to provide a tachometer characterized by its compact size and which permits of ease of installation in a wide variety of different applications. In this connection, it is a related object of the invention to provide an improved electromagnetic tachometer which employs relatively few moving components that are subject to wear.

Another and more specific object of the invention is to provide improved apparatus for measuring the rate of movement of a driven object and utilizing a pair of independent electromagnetic circuits each responsive to the position of a common rotating magnetic field—one for generating an A.C. signal and one for rectifying the induced A.C. signal—thus permitting the movable rectifying components to be packaged and sealed from communication with the surrounding environment.

It is still another object of the invention to provide a highly versatile tachometer which operates with the same degree of accuracy and reliability irrespective of the direction of movement of the rotating shaft or similar driving or driven member.

Other objects and advantages of the invention will become apparent as the following description proceeds, taken in conjunction with the accompanying drawings, in which:

FIGURE 1 is a longitudinal sectional view of a transmitter for an electromagnetic tachometer embodying the features of the present invention;

FIG. 2 is a sectional view, partly in elevation, of a portion of the transmitter shown in FIG. 1 with the housing removed;

FIGS. 3A–3D are diagrammatic stop action views, partly in section with the transverse housing plate removed and the rotating magnet shown in dotted lines for purposes of clarity, and illustrating particularly the alternating current rectifying mechanism at different angular positions of the rotating magnet;

FIG. 5 is a graphic representation of a theoretical ideal wave form for the current inducing flux established by rotation of a magnet mechanically connected to the device whose speed is to be measured;

FIG. 6 is a graphic representation of the rate of change of flux with respect to time in the current inducing circuit;

FIG. 7 is a graph illustrating the voltage produced across the output coil;

FIG. 8 is a graph illustrating the condition of the current rectifying contacts with respect to time; and, FIG. 9 is a graph illustrating the wave form for the rectified voltage applied across the R.C. network.

Figure 3C:
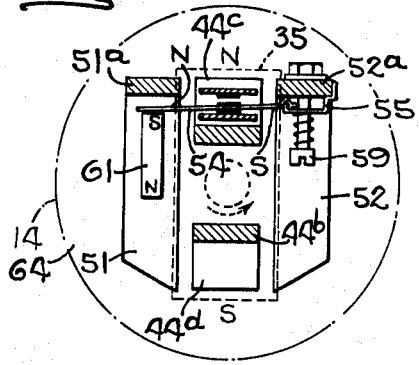

While the invention is susceptible of various modifications and alternative constructions, a specific embodiment thereof has been shown by way of example in the drawings and will herein be described in detail. It should be understood, however, that it is not intended to limit the invention to the particular form disclosed, but, on the contrary, the intention is to cover all modifications, equivalents and alternative constructions falling within the spirit and scope of the invention as expressed in the appended claims.

Referring more specifically to the drawings, an exemplary tachometer apparatus, generally indicated at 10 (FIG. 4), has been illustrated. As the description proceeds, it will become apparent that the novel features of the present invention will find use with a wide variety of systems and apparatus for measuring the speed or rate of movement of driving or driven members. However, to make clear one environment in which the invention finds particularly advantageous use, the invention is here illustrated and described in connection with a tachometer 10 for indicating the rotational speed of a rotating shaft. To this end, the tachometer apparatus includes a sender or transmitter 11 (FIGS. 1 and 4) for producing a speed signal proportional to the rotational speed of the shaft (not shown), and a remotely located indicator 12 (FIG. 4) for visually displaying (e.g., in revolutions per minute) the detected speed of the shaft.

As best illustrated in FIG. 1, the tachometer transmitter 11 includes a generally cylindrical housing 14, closed at one end by an integral end wall 15 and at its opposite end by a removable cap 16. The entire assembly is retained as a compact unitary construction by means of a pair of threaded fasteners 18 extending through the end cap 16 and coupled to the respective ends of a pair of tie posts 19, the latter being rigidly secured to the end wall 15 by a pair of threaded fasteners 20. In order to seal the interior of the housing 14, the end cap 16 is formed with an axially extending cylindrical portion 21 which terminates in a radially projecting annular shoulder 22. An annular sealing gasket 24 is mounted within a groove 25 formed at the junction of the radially extending shoulder 22 and the cylindrical portion 21. When the threaded fasteners 18, 20 are tightened, the cylindrical portion 21 of the end cap is snugly and telescopically received within the housing 14, the end of the housing being tightly clamped against the annular gasket 24.

In order to provide means for coupling the tachometer transmitter housing 14 to an engine drive shaft or the like (not shown), the end cap 16 has formed thereon an axially extending annular boss 26 defining an elongate bore 28. A generally cylindrical bearing sleeve 29 is snugly received within the bore 28 and rigidly secured in place by a pair of set screws 30 which project substantially radially through the boss 26 and are "dogged" down against the sleeve 29. The bearing sleeve 29 projects outwardly in an axial direction from the end cap 16 and is provided adjacent its outermost extremity with an outwardly directed radial stop flange 31 having an annular configuration. An internally threaded coupling nut 32 is slidably mounted on the projecting portion of the bearing sleeve 29—the nut being retained captive thereon by means of an inwardly directed annular stop flange 34 having an internal diameter sufficiently large to permit sliding movement of the nut 32 relative to the sleeve but sufficiently small to prevent passage of the flange 31 therethrough. The arrangement is such that the coupling nut 32 permits the transmitter 11 to be rigidly secured to a mating externally threaded coupling sleeve (not shown) on the engine whose speed is to be measured.

A U-shaped permanent magnet 35 which may be made of any of various commercially obtainable permanent magnetic alloys (for example, Alnico metal), is rigidly secured to a stub shaft 36 and journaled for rotation within the housing 14 by means of a pair of annular bearings 38, 39 mounted within the bearing sleeve 29. The stub shaft 36 has formed therein an axially disposed polygonal bore 40 adapted to receive a complementary polygonal shank portion of a drive tang 41. Thus, by coupling the drive tang 41 to the rotating shaft whose speed is to be measured, there is provided a direct mechanical driving connection between the shaft and the magnet 35.

The foregoing construction is particularly advantageous in that the air gap between the pole faces S, N of the magnet 35 and the associated magnetic circuit components can be accurately adjusted by the simple expedient of loosening the set screws 30, shifting the bearing sleeve 29 in an axial direction, and retightening the screws. Moreover, since the screws 30 are contained within the housing 14, tampering with the axial adjustment of the magnet 35 is inhibited.

Figure 4:
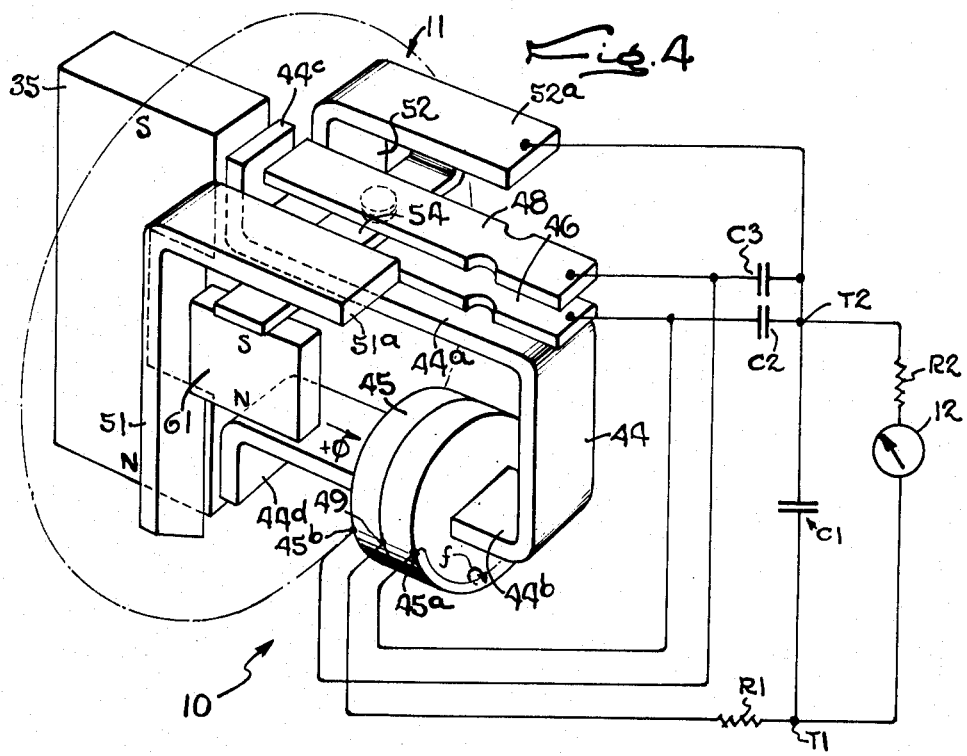
FIG. 4 is a simplified perspective view of a portion of the electromagnetic tachometer of the present invention and disclosing particularly the interrelationship between the magnetic circuits thereof.

In accordance with one of the important aspects of the present invention, there is provided a pair of independent magnetic circuits positioned to be magnetically coupled alternately to the magnet 35 as the latter rotates one of the magnetic circuits producing an alternating current speed signal and the other of the magnetic circuits including means for rectifying the alternating current induced. In the exemplary form of the invention, and as best illustrated in FIG. 4, the first magnetic circuit includes a generally U-shaped yoke or core 44 of magnetic material—the yoke having a pair of arms 44a–44b respectively terminating in a pair of coplanar flanges 44c–44d which are adjacent and slightly spaced from the pole faces S, N of the U-shaped magnet 35. It will be readily appreciated that as the magnet 35 rotates, the pole faces, for example face S, will first be alined with flange 44c and at a later point in time with flange 44d. Thus, the magnetic circuit defined by the yoke 44 establishes a flux path and, as the magnet 35 is rotated to reverse the positions of the pole faces S, N with respect to the flanges 44c, 44d, the magnetic flux in the yoke is reversed.

In order to produce an alternating current speed signal proportional to the rotational speed of the magnet 35, a coil 45 is wound around the arm 44b of the yoke 44. The opposite terminals 45a, 45b of the coil 45 are respectively coupled to a pair of contact plates 46, 48, while the midpoint or center tap 49 of the coil 45 is coupled through a current limiting resistor R1 to a capacitor C1. The arrangement is such that when the pole faces S, N of magnet 35 are respectively alined with the flanges 44c, 44d, a flux path (represented in FIG. 4 by the arrow $+\phi$) is established from the north pole N of the magnet 35 through the yoke 44 and back to the south pole S of the magnet. For the purpose of providing fine adjustment of the tachometer 10, a steel screw 47 (FIG. 2) is coupled to the yoke 44, the screw serving as a variable shunt between the yoke arms 44a, 44b. In the illustrative form of the invention, the screw is coupled to one of the yoke arms (e.g., arm 44b) with its threaded shank 47a extending toward the other arm (e.g., arm 44a). Thus, by suitable adjustment of the screw 47, the air gap between shank 47a and the spaced arm 44a may be varied to shunt a desired proportion of the flux in the yoke 44, thereby permitting accurate control of the voltage produced between the terminals 45a, 45b of coil 45.

Figure 3D:
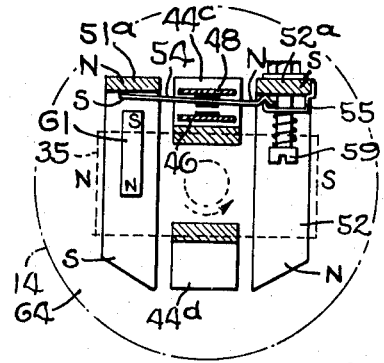

Referring now to FIGS. 3a–3d and FIG. 5 conjointly, it will be observed that when the pole face S of magnet 35 is adjacent flange 44c (FIG. 3a), the flux $\phi$ will be at a positive maximum value. As the magnet 35 is rotated (e.g., in a counterclockwise direction), the value of the flux $\phi$ will begin to decrease—becoming substantially zero when the magnet 35 has moved through an angle of 90° (FIGS. 3b and 5). When the magnet 35 has rotated 180°, thus alining the pole face S with flange 44d, the flux $\phi$ will be at a negative maximum value (FIGS. 3c and 5). Continued counterclockwise rotation of the magnet 35 will cause the value of the flux $\phi$ to start to increase—again becoming substantially zero when the magnet has moved through 270° (FIGS. 3d and 5). As the magnet 35 completes one full cycle of revolution and the pole face S returns to its starting position (FIG. 3a), the flux $\phi$ returns to its initial positive maximum value. Of course, while the graphic representation of flux in the yoke 44 has been represented in FIG. 5 as a sinusoidal wave, those skilled in the art will appreciate that the actual wave form may vary somewhat. However, for the purpose of the present description it should suffice to state that during the first 180° of angular rotation (assuming that the magnet 35 is initially oriented as shown in FIG. 4), the change in flux with respect to time ($d\phi/dt$) is negative (FIG. 6)—that is, flux $\phi$ is decreasing. Conversely, during the second 180° of angular rotation the change in flux with respect to time ($d\phi/dt$) is positive—that is, flux $\phi$ is increasing.

Effectively then, as is conventional with magnetic circuits of the type described above, during the first 180° of counterclockwise rotation of the magnet 35 when ($d\phi/dt$) is negative, the current induced in coil 45 will produce a flux (represented by the arrow in FIG. 4) tending to oppose the change in flux $d\phi/dt$. Referring to FIG. 4, it will be observed that in order to produce such an opposing flux, current must flow through the coil from the terminal 45a towards the terminal 45b. Since the coil 45 is now acting as a battery, the terminal 45a will be negative with respect to terminal 45b during the first half revolution of magnet 35. Conversely, during the second 180° of angular magnet rotation when $d\phi/dt$ is positive, current will flow in the coil 45 from terminal 45b towards terminal 45a, thus establishing flux tending to oppose the increasing change in flux $\phi$ in the yoke 44. In other words, during the latter half of a single cycle of magnet rotation, the terminal 45b is negative with respect to terminal 45a. It will be appreciated, therefore, that during a single cycle of magnet rotation, current will flow in the coil 45 first in one direction and then in the opposite direction—i.e., an alternating current is induced. A typical voltage curve 50 representative of the voltage E between terminals 45a and 45b has been illustrated in FIG. 7.

In carrying out the present invention, provision is made for rectifying the alternating current induced in the coil 45 during rotation of the magnet 35. To accomplish this, a pair of pole shoes 51, 52, which are made of magnetic material, are disposed in the plane of the yoke flanges 44c, 44d. In the illustrative form of the invention, the shoes are respectively disposed on opposite sides of the flanges and may be rigidly secured to the housing 14 in any suitable manner. The shoes 51, 52 are respectively provided with rearwardly projecting extensions 51a, 52a. An armature 54 is pivotally mounted on one of the extensions (here the extension 52a) by means of a clamping plate 55 having a flange 56 positioned to engage a corresponding groove 58 formed in the armature end 54a. In order that the clamp 55 will yieldably urge the armature end 54a into pivotal engagement with the extension 52a, the clamp is secured to the extension 52a by means of a threaded fastener 59 having a concentrically mounted spring 60 interposed between the head of the threaded fastener and the clamp. The opposite end 54b of the armature 54 is positioned beneath the extension 51a. As best illustrated in FIGS. 3a–3d and FIG. 4, the armature 54 extends between the ends of contact plates 46, 48 and is arranged to alternately engage the contact plates. In order to prevent arcing of the contacts during actuation of the armature, a pair of capacitors C2, C3 are respectively connected in shunt from the contact plates 46, 48 to the armature 54.

Referring more particularly to FIG. 3a, it will be noted that when the magnet 35 is positioned with its south pole S adjacent flange 44c, the free end 54b of armature 54 is normally urged downwardly into a position such that the armature engages the lower contact plate 46. This is accomplished by providing a permanent magnet 61 spaced beneath the extension 51a and slightly below the armature 54, the magnet 61 tending to polarize the armature 54, thus preventing "double acting" thereof, i.e., the armature 54 is magnetically attracted or urged downwardly during 180° of rotation of magnet 35 when the polarity of the free armature end 54b is unlike the polarity of the adjacent end of the magnet 61, and magnetically repelled or urged upwardly during the remaining 180° of rotation of the magnet 35. When as previously discussed, the pole face S of the magnet 35 rotates in a counterclockwise direction through 180° (from the position shown in FIG. 3a to that shown in FIG. 3c), the coil 45 acts as a battery, producing unidirectional current flow through coil 45 and completing a charging circuit for capacitor C1 from terminal 45a (now at a negative voltage level with respect to terminal 45b), through the center tap 49, resistor R1, capacitor C1, armature 54, contact plate 46 and back to terminal 45a. During the 180° counterclockwise rotation of the magnet 35 from the position shown in FIG. 3a to the position shown in FIG. 3c, the pole face S of the magnet 35 overlies the shoe 51, polarizing the latter north and its extension 51a south. During the same period of time the shoe 52 is alined with the pole face N of the magnet 35, thus polarizing the shoe 52 south and its extension 52a north. Since the end 54a of the armature 54 is mechanically connected to the extension 52a, the former is polarized south. It will be appreciated by reference to FIGS. 3a–3c that during the first 180° of counterclockwise rotation the north end of the polarized armature 54 is disposed between the relatively strong south pole of magnet 61 and the relatively weak south pole or shoe extension 51a. Consequently, the armature is attracted towards the magnet 61, thus closing the circuit including contact plate 46 and opening the circuit including contact plate 48.

However, momentarily after the magnet 35 rotates past the position shown in FIG. 3c, the pole face S of the magnet 35 is alined with the shoe 52 while the pole face N of the magnet 35 is alined with the shoe 51. As a result, the polarities of the extensions 51a and 52a are respectively north and south (FIG. 3d). Since the pivoted end 54a of armature 54 is mechanically connected to the extension 52a (now polarized south) this end of the armature is now polarized north—the air gap between the south pole of the relatively strong magnet 61 and the free end 54b of the armature preventing the former from polarizing the latter. Under these conditions of polarity, the free end 54b of the armature 54 is now polarized south and is therefore attracted by the extension 51a (now polarized north) and repelled by the south pole of the magnet 61. As a consequence of the foregoing arrangement, the armature 54 snaps upwardly, completing the circuit including contact plate 48 and opening the circuit including contact plate 46. When as previously described, the pole face S of magnet 35 rotates in a counterclockwise direction through 180° (from the position shown in FIG. 3c to that shown in FIG. 3a), the coil 45 acts as a battery to produce unidirectional current flow in the opposite direction and completing a charging circuit for capacitor C1 from terminal 45b (now at a negative voltage level with respect to terminal 45a), through the center tap 49, resistor R1, capacitor C1, armature 54, contact plate 48 and back to terminal 45b.

Turning now to FIGS. 7, 8 and 9, the rectifying function of the contact plates 46, 48 and armature 54 has been graphically illustrated. As shown in FIG. 7, at time instant $t_1$ (the magnet 35 being oriented as shown in FIG. 3a) the voltage drop across the coil 45 is zero—i.e., no current is flowing. At time instant $t_2$ (the magnet 35 being oriented as shown in FIG. 3b) the voltage drop across the coil 45 is at a maximum and is negative. At time instant $t_3$ (the magnet 35 being oriented as shown in FIG. 3c) the voltage drop across the coil 45 is again zero. At time instant $t_4$ (the magnet now being oriented as shown in FIG. 3d) the voltage drop across the coil 45 is again at a maximum and is now positive. Finally, at time instant $t_5$ the magnet 35 returns to its starting position, again reducing the voltage drop across the coil 45 to zero. Considering FIG. 8, it will be observed that momentarily after time instant $t_3$, the armature 54 is switched to engage contact plate 48 as previously described. As a result substantially all of the positive area under the curve 50 (FIG. 7) will appear as shown in FIG. 9, thus producing a substantially continuous negative voltage applied across the R.C. network defined by resistance R1 and capacitor C1 (FIG. 4).

Since the meter 12 is connected in series with a resistance R2 and across the terminals T1, T2 of capacitor C1, the meter 12 will display (in any suitable scale such, for example, as r.p.m.) the average voltage $E_{avg}$ (FIG. 9) to which the capacitor C1 is charged during rotation of the magnet 35. Of course, as the speed of the engine shaft increases, the frequency of flux reversal in yoke 44 (represented by the sinusoidal wave shown in FIG. 5) will increase. As a result, the amplitude of $d\phi/dt$ (FIG. 6) will increase with a consequent increase in the amplitude of the voltage applied across the R.C. network. Conversely, if the engine shaft slows down, the frequency of flux reversal in yoke 44 will decrease, with a consequent decrease in the amplitude of $d\phi/dt$ (FIG. 6) and a resulting decrease in the amplitude of the voltage applied across the R.C. network. Since the amplitude of the average voltage $E_{avg}$ (FIG. 9) is proportional to the speed of the driving shaft, the meter 12 will accurately represent the speed of the shaft. The provision of a resistor R2 in series with the meter 12 greatly increases the versatility of the tachometer 10. Thus, by suitable selection of the ohmic value of resistor R2, a ratio of 1:1 can be maintained between the speed (e.g., in r.p.m.) of the shaft being measured and the meter reading irrespective of the speed ratio between the shaft and the take-off shaft (not shown) to which the magnet 35 is mechanically connected. Merely by way of example, the various circuit components can be selected so that when the speed ratio between the take-off shaft and engine shaft is 1:2, the meter 12 will provide a direct reading of engine speed when resistor R2 is omitted. Should the speed ratio between the take-off shaft and engine shaft be other than 1:2 (e.g. 1:1 or 2:1), a resistor R2 having an appropriate value is inserted in the circuit to maintain the meter reading to engine shaft ratio at 1:1.

In accordance with another object of the present invention, provision is made for sealing the current rectifying components from communication with surrounding environs, thus preventing deposits of oil and dirt from forming on the contact plates 46, 48 and armature 54, which deposits would effect circuit resistance and prevent good electrical contact, resulting from oil, dirt and fumes. In the exemplary form of the invention this is accomplished by segregating that portion of the housing 14 containing the contact plates 46, 48 and armature 54 from direct communication not only with the external portions of the housing, but also from the rotating magnet 35 and its associated bearings 38, 39—the only coupling between the rectifying components and the magnet 35 being a magnetic linkage.

As best illustrated in FIG. 1, this is accomplished by mounting a transverse plate or wall 62 which extends completely across the housing 14 intermediate the end wall 15 and end cap 16, thus dividing the housing into a pair of chambers 64, 65—the chamber 64 housing the yoke 44, coil 45 and rectifying components 46, 48, 54, while the chamber 65 houses the rotating magnet 35. In order to firmly seat the wall 62 and to effectively seal the chambers 64, 65 from communication with one another, the wall 62 has mounted thereon a sealing gasket 66, the latter being positioned between the wall 62 and a circumferentially disposed internal bead 68 formed in the housing 14. A pair of spaced sleeves 69 are concentrically mounted about the shanks of the threaded fasteners 18 so that when the end cap 16 is assembled to the housing 14 and the fasteners 18 tightened down in posts 19, the gasket 66 is tightly clamped between the plate 62 and the bead 68.

It will be appreciated that the plate 62 may serve several functions. That is, not only does it serve to isolate the rectifying components from contaminating substances, thus prolonging the life of the tachometer, but moreover the plate serves to support the yoke 44, shoes 51, 52 and related equipment. To this end, the arms 44a, 44b of the yoke 44 project through apertures formed in the plate 62 into the rotating magnet chamber 65. The flanges 44c, 44d are then rigidly secured to the face of the plate 62 in any suitable manner as, for example, by soldering, welding, bolting or the like. In like manner the shoes 51, 52 are rigidly secured to the face of the plate 62 so that their respective extensions 51a, 52a extend rearwardly through the plate and into the chamber 64. The apertures through which the extensions 51a, 52a and yoke arms 44a, 44b extend may be sealed in any suitable manner as, for example, by soldering or the application of a suitable sealing resin.

It will be appreciated that there has been disclosed a novel electromagnetic tachometer which is not only highly accurate and reliable because of the fact that the rectifying components are isolated, but moreover the tachometer is constructed from only a few inexpensive components and, aside from the rotating magnet 35, employs only a single moving element, thus minimizing both the initial cost of the tachometer and the time and cost required for maintenance. Of course, while the tachometer has been disclosed in connection with a shaft rotating at a particular speed and in a particular direction, it will be understood that the operation is similar for other speeds and in other directions. Moreover, the two independent magnetic circuits which are successively energized by the same moving magnet may be arranged in such a manner as to be capable of measuring the rate of movement of other than rotating shafts.

I claim as my invention:

1. In a device for measuring the speed of a moving object, the combination comprising first and second magnetic circuits, said first circuit including a coil, a magnet having a pair of pole faces positioned adjacent said first and second circuits and movable with respect thereto, each of the pole faces of said magnet being magnetically coupled alternately to said first and second magnetic circuits during movement thereof so that alternating current flow is induced in said coil as said pole faces of said magnet successively and alternately move past said first magnetic circuit, means for coupling said magnet to the object, said second circuit including magnetically actuated armature means coupled to said coil, a pair of contacts coupled to said coil, said armature means being positioned for alternate engagement with each of said contacts, said armature means being shifted between its two positions respectively engaged with different ones of said contacts by magnetic action as the pole faces of said magnet successively and alternately move past said second magnetic circuit for rectifying the alternating current induced in said coil, and current responsive means coupled to said coil for indicating the rate of movement of said driven magnet.

2. In a tachometer for measuring the speed of a moving object, the combination comprising, first and second magnetic circuits, said first circuit including a coil, a rotating magnet having a pair of pole faces positioned adjacent said first and second circuits and movable with respect thereto, each of the pole faces of said magnet being magnetically coupled alternately to said first and second magnetic circuits during movement thereof so that alternating current flow is induced in said coil as said pole faces of said magnet successively and alternately move past said first magnetic circuit, means for coupling said magnet to the object, said second circuit including magnetically actuated armature means coupled to said coil, a pair of contacts coupled to said coil, said armature means being positioned for alternate engagement with each of said contacts, said armature means being shifted between its two positions respectively engaged with different ones of said contacts by magnetic action as the pole faces of said magnet successively and alternately move past said second magnetic circuit for rectifying the alternating current induced in said coil.

3. In a tachometer for measuring the speed of a moving object, the combination comprising, first and second magnetic circuits, said first circuit including a coil, a rotating magnet having a pair of pole faces positioned adjacent said first and second circuits and movable with respect thereto, each of the pole faces of said magnet being magnetically coupled alternately to said first and second magnetic circuits during movement thereof so that alternating current flow is induced in said coil as said pole faces of said magnet successively and alternately move past said first magnetic circuit, means for coupling said magnet to the object, said second circuit including magnetically actuated armature means coupled to said coil, a pair of contacts coupled to said coil, said armature means being positioned for alternate engagement with each of said contacts, said armature means being shifted between its two positions respectively engaged with different ones of said contacts by magnetic action as the pole faces of said magnet successively and alternately move past said second magnetic circuit for rectifying the alternating current induced in said coil, and current responsive means coupled to said coil for indicating the rotational speed of said magnet.

4. In a tachometer for measuring the speed of a moving object, the combination comprising, first and second magnetic circuits, said first circuit including a coil, a driven magnet having a pair of pole faces positioned adjacent said first and second circuits and movable with respect thereto, each of the pole faces of said magnet being magnetically coupled alternately to said first and second magnet circuits during movement thereof so that alternating current flow is induced in said coil as said pole faces of said magnet successively and alternately move past said first magnetic circuit, means for coupling said magnet to the object, said second circuit including magnetically actuated armature means coupled to said coil, a pair of contacts coupled to said coil, said armature means being positioned for alternate engagement with each of said contacts, said armature means being shifted between its two positions respectively engaged with different ones of said contacts by magnetic action as the pole faces of said magnet successively and alternately move past said second magnetic circuit for rectifying the alternating current induced in said coil, and means for polarizing said movable armature means to prevent double action thereof.

5. In a tachometer for measuring the speed of a moving object, the combination comprising, first and second magnetic circuits arranged in angularly related intersecting planes, said first circuit including a coil, a rotating magnet having a pair of pole faces positioned adjacent said first and second circuits and movable with respect thereto, each of the pole faces of said magnet being magnetically coupled alternately to said first and second magnetic circuits during movement thereof so that alternating current flow is induced in said coil as said pole faces of said magnet successively and alternately move past said first magnetic circuit, means for coupling said magnet to the object, said second circuit including magnetically actuated armature means coupled to said coil, a pair of contacts coupled to said coil, said armature means being positioned for alternate engagement with each of said contacts, said armature means being shifted between its two positions respectively engaged with different ones of said contacts by magnetic action as the pole faces of said magnet successively and alternately move past said second magnetic circuit for rectifying the alternating current induced in said coil.

6. In a tachometer for measuring the speed of a moving object, the combination comprising, an enclosed chamber, first and second magnetic circuits mounted within said enclosed chamber, said first circuit including a coil, a rotating magnet having a pair of pole faces mounted outside of said chamber and adjacent said first and second circuits and movable with respect thereto, each of the pole faces of said magnet being magnetically coupled alternately to said first and second magnetic circuits during movement thereof so that alternating current flow is induced in said coil as said pole faces of said magnet successively and alternately move past said first magnetic circuit, means for coupling said magnet to the object, said second circuit including magnetically actuated armature means coupled to said coil, a pair of contacts coupled to said coil, said armature means being positioned for alternate engagement with each of said contacts, said armature means being shifted between its two positions respectively engaged with different ones of said contacts by magnetic action as the pole faces of said magnet successively and alternately move past said second magnetic circuit for rectifying the alternating current induced in said coil, and current responsive means coupled to said coil and disposed remotely from said chamber for indicating the rotational speed of said magnet.

7. In a device for measuring the rate of movement of a driving member, the combination comprising, a stationary yoke having a pair of arms defining a U-shaped flux path, a magnet coupled to and driven by said member, said magnet having a pole face spaced apart from and positioned for successive alinement with the arms of said yoke for reversing the magnetic flux in said yoke as said magnet is moved, a coil wound about one arm of said yoke, a magnetic circuit positioned to be alternately alined with said magnet as the latter is successively alined with the arms of said yoke, said magnetic circuit including magnetically actuated armature means coupled to said coil, a pair of contacts coupled to said coil, said armature means being positioned for alternate engagement with each of said contacts, said armature means being shifted between its two positions respectively engaged with different ones of said contacts by magnetic action as said pole face of said magnet moves past said magnetic circuit for rectifying the alternating current induced in said coil, and current responsive means coupled to said coil for indicating the rate of movement of said driving member.

8. In a device for measuring the rate of movement of a driving member, the combination comprising, a stationary yoke having a pair of arms defining a U-shaped flux path, a magnet coupled to and driven by said member, said magnet a pole face spaced apart from and positioned for successive alinement with the arms of said yoke for reversing the magnetic flux in said yoke as said magnet is moved, a coil wound about one arm of said yoke, a magnetic circuit positioned to be alternately alined with said magnet as the latter is successively alined with the arms of said yoke, said magnetic circuit including magnetically actuated armature means coupled to said coil, a pair of contacts coupled to said coil, said armature means being positioned for alternate engagement with each of said contacts, said armature means being shifted between its two positions respectively engaged with different ones of said contacts by magnetic action as said pole face of said magnet moves past said magnetic circuit for rectifying the alternating current induced in said coil, means for polarizing said armature means to prevent double action thereof, and current responsive means coupled to said coil for indicating the rate of movement of said driving member.

9. In a tachometer for measuring the rotational speed of a rotating shaft, the combination comprising, a stationary yoke having a pair of arms defining a U-shaped flux path, a magnet coupled to and rotationally driven by the shaft, said magnet having a pair of coplanar pole faces spaced apart from and positioned for successive alinement with the arms of said yoke for reversing the magnetic flux in said yoke as said magnet is rotated, a coil wound about one arm of said yoke, a magnetic circuit positioned to be alternately alined with the arms of said yoke, said magnetic circuit including magnetically actuated armature means coupled to said coil, a pair of contacts coupled to said coil, said armature means being positioned for alternate engagement with each of said contacts, said armature means being shifted between its two positions respectively engaged with different ones of said contacts by magnetic action as the pole faces of said magnet successively and alternately move past said magnetic circuit for rectifying the alternating current induced in said coil, and current responsive means coupled to said coil for indicating the rotational speed of the shaft.

10. In a tachometer for measuring the rotational speed of a rotating shaft, the combination comprising, a housing, a wall extending transversely of said housing and defining therewith a sealed chamber, a magnet coupled to and rotationally driven by said shaft, said magnet mounted externally of said chamber and having a pole face adjacent said wall, a first magnetic circuit mounted in said chamber, said circuit including a core of magnetic material defining a flux path, said core being positioned in said housing so that rotation of said magnet moves said pole face successively past the opposite ends of said core thereby reversing the magnetic flux in said core as said magnet is rotated, a coil mounted in said chamber and surrounding said core for producing alternating current proportional to the rotational speed of said magnet as rotation of the latter reverses and varies the magnetic flux in said core, a second magnetic circuit mounted in said chamber, said second circuit including magnetically actuated armature means coupled to said coil, a pair of contacts coupled to said coil, said armature means being positioned for alternate engagement with each of said contacts, said armature means being shifted between its two positions respectively engaged with different ones of said contacts by magnetic action as said pole face of said magnet moves past said second magnetic circuit for rectifying the alternating current produced in said coil, and current responsive means disposed externally of said chamber and coupled to said coil for indicating the rotational speed of said shaft.

11. In a tochometer for measuring the rotational speed of a rotating shaft, the combination comprising, a housing, a wall extending transversely of said housing and defining first and second chambers therein sealed from one another, a magnet coupled to and rotationally driven by said shaft, said magnet mounted in said first chamber and having a pole face adjacent said wall, a first magnetic circuit mounted in said second chamber, said circuit including a core of magnetic material defining a flux path, said core being positioned in said housing so that rotation of said magnet moves said pole face successively past the opposite ends of said core thereby reversing the magnetic flux in said core as said magnet is rotated, a coil mounted in said second chamber remote from said first chamber, said coil surrounding said core for producing alternating current proportional to the rotational speed of said magnet as rotation of the latter reverses and varies the magnetic flux in said core, a second magnetic circuit mounted in said second chamber, said second circuit including magnetically actuated armature means coupled to said coil, a pair of contacts coupled to said coil, said armature means being positioned for alternate engagement with each of said contacts, said armature means being shifted between its two positions respectively engaged with different ones of said contacts by magnetic action as said pole face of said magnet moves past said second magnetic circuit for rectifying the alternating current produced in said coil, and current responsive means coupled to said coil for indicating the rotational speed of said shaft.

12. In a tachometer for measuring the rotational speed of a rotating shaft, the combination comprising, a housing, a wall extending transversely of said housing and defining first and second chambers therein sealed from one another, a magnet coupled to and rotationally driven by said shaft, bearing means mounted in said first chamber for journaling said magnet for rotation therein, said magnet having at least one pole face adjacent said wall, a first magnetic circuit mounted in said second chamber, said circuit including a core of magnetic material defining a flux path, said core being positioned in said housing so that rotation of said magnet moves said pole face successively past the opposite ends of said core thereby reversing the magnetic flux in said core as said magnet is rotated, a coil mounted in said second chamber remote from said first chamber, said coil surrounding said core for producing alternating current proportional to the rotational speed of said magnet as rotation of the latter reverses and varies the magnetic flux in said core, a second magnetic circuit mounted in said second chamber, said second circuit including magnetically actuated armature means coupled to said coil, a pair of contacts coupled to said coil, said armature means being positioned for alternate engagement with each of said contacts, said armature means being shifted between its two positions respectively engaged with different ones of said contacts by magnetic action as said pole face of said magnet moves past said second magnetic circuit for rectifying the alternating current produced in said coil, and current responsive means coupled to said coil for indicating the rotational speed of said shaft.

13. In a tachometer for measuring the rotational speed of a rotating shaft, the combination comprising, a housing, a wall extending transversely of said housing and defining first and second chambers sealed from one another, a magnet coupled to and rotationally driven by said shaft, said magnet mounted in said first chamber and having a pair of coplanar pole faces, a yoke mounted in said second chamber and defining a flux path, said yoke having a pair of arms projecting through said wall into said first chamber and terminating in a plane spaced from said magnet, a pair of shoes mounted in said first chamber on opposite sides of the projecting ends of said pair of arms and having extensions projecting through said wall into said second chamber, coil means mounted on said yoke for producing alternating current proportional to the rotational speed of said shaft, an armature pivotally mounted on one of said extensions and alternately repelled from and attracted towards the other of said extensions, said armature being coupled to said coil, and contact means coupled to said coil and actuated by said armature in response to pivotal movement of the latter for rectifying the alternating current induced in said coil.

14. In a tachometer for measuring the rotational speed of a rotating shaft, the combination comprising a housing, a wall extending transversely of said housing and defining a sealed chamber therein, a magnet coupled to and rotationally driven by said shaft, said magnet having a pair of coplanar pole faces mounted externally of and adjacent to said chamber, a yoke mounted in said chamber and defining a flux path, said yoke having a pair of arms projecting outwardly through said wall and terminating in a plane spaced from said magnet, a pair of shoes mounted externally of said chamber on opposite sides of the projecting ends of said pair of arms and having extensions projecting through said wall into said chamber, coil means mounted on said yoke for producing alternating current proportional to the rotational speed of said shaft, an armature pivotally mounted on one of said extensions and alternately repelled from and attracted towards the other of said extensions, said armature being coupled to said coil, contact means coupled to said coil and actuated by said armature in response to pivotal movement of the latter for rectifying the alternating current induced in said coil, and current responsive means coupled to said coil for indicating the rotational speed of said shaft.

15. In a tachometer for measuring the rotational speed of a rotating shaft, the combination comprising, a housing, a wall extending transversely of said housing and defining first and second chambers sealed from one another, a magnet coupled to and rotationally driven by said shaft, said magnet mounted in said first chamber and having a pair of coplanar pole faces, a yoke mounted in said second chamber and defining a flux path, said yoke having a pair of arms projecting through said wall into said first chamber and terminating in a plane spaced from said magnet, a pair of shoes mounted in said first chamber on opposite sides of the projecting ends of said pair of arms and having extensions projecting through said wall into said second chamber, coil means mounted on said yoke for producing alternating current proportional to the rotational speed of said shaft, an armature pivotally mounted on one of said extensions and alternately repelled from and attracted towards the other of said extensions, said armature being coupled to said coil, contact means coupled to said coil and actuated by said armature in response to pivotal movement of the latter for rectifying the alternating current induced in said coil, and current responsive means coupled to said coil for indicating the rotational speed of said shaft.

16. In a tachometer for measuring the rotational speed of a rotating shaft, the combination comprising, a housing, a wall extending transversely of said housing and defining first and second chambers sealed from one another, a magnet coupled to and rotationally driven by said shaft, said magnet mounted in said first chamber and having a pair of coplanar pole faces, a yoke mounted in said second chamber and defining a flux path, said yoke having a pair of arms projecting through said wall into said first chamber and terminating in a plane spaced from said magnet, a pair of shoes mounted in said first chamber on opposite sides of the projecting ends of said pair of arms and having extensions projecting through said wall into said second chamber, coil means mounted on said yoke for producing alternating current proportional to the rotational speed of said shaft, an armature pivotally mounted on one of said extensions and alternately repelled from and attracted towards the other of said extensions, said armature being coupled to said coil, contact means coupled to said coil and actuated by said armature in response to pivotal movement of the latter for rectifying the alternating current induced in said coil, and means for polarizing said armature to prevent double action thereof.

17. In a tachometer for measuring the rotational speed of a rotating shaft, the combination comprising, a housing, a wall extending transversely of said housing and defining first and second chambers sealed from one another, a magnet coupled to and rotationally driven by said shaft, said magnet mounted in said first chamber and having a pair of coplanar pole faces, a yoke mounted in said second chamber and defining a flux path, said yoke having a pair of arms projecting through said wall into said first chamber and terminating in a plane spaced from said magnet, a pair of shoes mounted in said first chamber on opposite sides of the projecting ends of said pair of arms and having extensions projecting through said wall into said second chamber, said yoke and said shoes respectively defining angularly related magnetic circuits disposed in respective ones of intersecting planes so that rotation of said magnet will cause its pole faces to be successively alined with said yoke and said shoes, coil means mounted on said yoke for producing alternating current proportional to the rotational speed of said shaft, an armature pivotally mounted on one of said extensions and alternately repelled from and attracted towards the other of said extensions, said armature being coupled to said coil, and contact means coupled to said coil and actuated by said armature in response to pivotal movement of the latter for rectifying the alternating current induced in said coil.

References Cited by the Examiner

UNITED STATES PATENTS

| | | | |
|---|---|---|---|
| 1,960,599 | 5/1934 | Silva | 321—2 |
| 2,446,761 | 8/1948 | Harmon | 310—127 |
| 2,460,999 | 2/1949 | Nilson et al. | 324—70 |
| 2,541,906 | 2/1951 | Anderson | 310—86 |
| 2,768,315 | 10/1956 | Okabe | 310—86 |
| 3,103,628 | 9/1963 | Takaya | 324—70 |

WALTER L. CARLSON, *Primary Examiner.*

FREDERICK M. STRADER, *Examiner.*

C. W. HOFFMANN, E. L. STOLARUN,
*Assistant Examiners.*